United States Patent
Jeon

(10) Patent No.: US 10,388,973 B2
(45) Date of Patent: Aug. 20, 2019

(54) FUEL CELL STACK DIAGNOSTIC SYSTEM AND DIAGNOSTIC METHOD THEREOF

(71) Applicant: Hyundai Motor Company, Seoul (KR)

(72) Inventor: Kang Sik Jeon, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 188 days.

(21) Appl. No.: 15/201,466

(22) Filed: Jul. 3, 2016

(65) Prior Publication Data
US 2017/0125830 A1     May 4, 2017

(30) Foreign Application Priority Data
Oct. 28, 2015   (KR) .................. 10-2015-0150352

(51) Int. Cl.
| | |
|---|---|
| *H01M 8/04537* | (2016.01) |
| *H01M 8/04992* | (2016.01) |
| *H01M 8/04082* | (2016.01) |
| *H01M 8/04225* | (2016.01) |
| *H01M 8/04746* | (2016.01) |
| *H01M 8/04664* | (2016.01) |
| *H01M 8/04302* | (2016.01) |
| *H01M 8/1018* | (2016.01) |

(52) U.S. Cl.
CPC ... *H01M 8/04552* (2013.01); *H01M 8/04201* (2013.01); *H01M 8/04225* (2016.02); *H01M 8/04302* (2016.02); *H01M 8/04589* (2013.01); *H01M 8/04671* (2013.01); *H01M 8/04753* (2013.01); *H01M 8/04992* (2013.01); *H01M 2008/1095* (2013.01); *H01M 2250/20* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 2009/0258257 | A1* | 10/2009 | Kaito | ............... | H01M 8/04179 429/430 |
| 2011/0086284 | A1* | 4/2011 | Chowdhury | ...... | H01M 8/04559 429/429 |
| 2011/0151347 | A1* | 6/2011 | Araki | ............... | H01M 8/04552 429/431 |
| 2016/0141654 | A1* | 5/2016 | Saito | ............... | H01M 8/04089 429/446 |

FOREIGN PATENT DOCUMENTS

| | | | |
|---|---|---|---|
| CN | 101566594 | * | 10/2009 |
| JP | 2006-153780 A | | 6/2006 |
| JP | 2008-209357 A | | 9/2008 |
| KR | 10-2011-0036448 A | | 4/2011 |

OTHER PUBLICATIONS

CN101566594 English translation. Sun et al. China. Oct. 28, 2009. (Year: 2009).*

* cited by examiner

*Primary Examiner* — Christopher P Domone
(74) *Attorney, Agent, or Firm* — Mintz Levin Cohn Ferris Glovsky and Popeo, P.C.; Peter F. Corless

(57) ABSTRACT

A fuel cell stack diagnostic system is provided. The system includes a fuel cell stack having a plurality of cell channels and a diagnostic analyzer that performs a voltage measurement on each of the plurality of cell channels. The diagnostic analyzer determines that the voltage measurement is abnormal as a first level when a voltage ratio is less than a first reference voltage ratio when starting a vehicle in which the fuel cell stack diagnostic system is mounted. Additionally, the voltage ratio is a ratio of a minimum cell channel voltage to an average cell channel voltage.

16 Claims, 3 Drawing Sheets

FUEL CELL STACK DIAGNOSTIC SYSTEM AND DIAGNOSTIC METHOD THEREOF

CROSS-REFERENCE TO RELATED APPLICATION

This application claims priority to and the benefit of Korean Patent Application No. 10-2015-0150352 filed in the Korean Intellectual Property Office on Oct. 28, 2015, the entire contents of which are incorporated herein by reference.

BACKGROUND (a) Field of the Invention

The present invention relates to a fuel cell stack diagnostic system and a diagnostic method thereof, and more particularly, to a fuel cell stack diagnostic system and method thereof which more accurately determines whether a damage signal indicates a damaged unit cell.

(b) Description of the Related Art

A fuel cell vehicle generally uses a fuel cell stack and a high voltage battery to drive a motor. For example, when a vehicle is traveling uphill, electric power from both the fuel cell stack and the high voltage battery may be used to drive the motor. When a vehicle is traveling on a substantially straight road having no incline, electric power from the fuel cell stack may be used to drive the motor and the high voltage battery may be charged. When a vehicle is traveling downhill, the high voltage battery may be charged by regenerative braking energy produced by the motor, and electric power from the fuel cell stack is generated minimally.

Additionally, each unit cell of the fuel cell stack may be monitored using a stack voltage monitor (SVM) to determine whether each unit cell functions normally (e.g., without error). However, when the SVM fails or malfunctions, a diagnostic analyzer may misdiagnose a unit cell of the fuel cell stack as damaged and produce a damage signal. The diagnostic analyzer may be a fuel cell control unit (FCU). Therefore, a fuel cell stack diagnostic system and a diagnostic method thereof, which more accurately determine whether the damage signal from the diagnostic analyzer indicates that there is a real damaged unit cell or is merely a sensing error of the SVM, are required.

The above information disclosed in this section is merely for enhancement of understanding of the background of the invention and therefore it may contain information that does not form the prior art that is already known in this country to a person of ordinary skill in the art.

SUMMARY

The present invention provides a fuel cell stack diagnostic system and a diagnostic method thereof which more accurately determine whether the damage signal from the diagnostic analyzer indicates a damaged unit cell or is merely a sensing error of a SVM.

A fuel cell stack diagnostic system according to an exemplary embodiment may include: a fuel cell stack having a plurality of cell channels; and a diagnostic analyzer configured to receive a voltage measurement regarding each of the plurality of cell channels, wherein the diagnostic analyzer may be configured to determine that the voltage measurement is abnormal as a first level when a voltage ratio is less than a first reference voltage ratio when starting a vehicle, and wherein the voltage ratio may be a ratio of a minimum cell channel voltage to an average cell channel voltage.

The fuel cell stack diagnostic system may be configured to supercharge the fuel cell stack with at least one of air and hydrogen gas, and the diagnostic analyzer may be configured to determine that the voltage measurement is abnormal as a second level when the voltage ratio is less than a second reference voltage ratio after the supercharging. The diagnostic analyzer may further be configured to determine that at least one unit cell included in a cell channel having the minimum cell channel voltage is damaged when the voltage ratio is equal to or greater than the second reference voltage ratio after the supercharging.

Additionally, the diagnostic analyzer may be configured to determine that a pinhole (e.g., a minimal opening) is formed at a membrane of the at least one unit cell when the voltage ratio is equal to or greater than the second reference voltage ratio after the supercharging. The diagnostic analyzer may be configured to determine that the voltage measurement is abnormal as a third level when the voltage ratio is in a reference voltage ratio range while the vehicle is being driven. The vehicle may be configured to generate driving torque using a stack current output from the fuel cell stack.

The diagnostic analyzer may further be configured to calculate a slope of a trend line generated by plotting the voltage ratio according to the stack current, and determine that the voltage measurement is abnormal as a fourth level when an absolute value of the slope is less than a reference slope. The diagnostic analyzer may be configured to calculate the voltage ratio without using a voltage value measured from the cell channel having the minimum cell channel voltage when the voltage measurement is determined as abnormal. In addition, the diagnostic analyzer may be configured to determine that the voltage measurement is abnormal as the first level when an open circuit voltage of a load is equal to or greater than a reference voltage and the voltage ratio is maintained at less than the first reference voltage ratio for a reference time period when starting the vehicle.

A fuel cell stack diagnosing method according to an exemplary embodiment may include: performing, by the SVM, a voltage measurement on each of the plurality of cell channels included in a fuel cell stack; and determining, by a diagnostic analyzer, that the voltage measurement is abnormal as a first level when a voltage ratio is less than a first reference voltage ratio when starting a vehicle, wherein the voltage ratio may be a ratio of a minimum cell channel voltage to an average cell channel voltage.

The fuel cell stack diagnosing method may further include: supercharging the fuel cell stack with at least one of air and hydrogen gas; and determining that the voltage measurement is abnormal as a second level when the voltage ratio is less than a second reference voltage ratio after the supercharging. The fuel cell stack diagnosing method may further include: determining that at least one unit cell included in a cell channel having the minimum cell channel voltage is damaged when the voltage ratio is equal to or greater than the second reference voltage ratio after the supercharging.

The determination that the at least one unit cell is damaged may include determining that a pinhole is formed at a membrane of the at least one unit cell. The fuel cell stack diagnosing method may further include determining that the voltage measurement is abnormal as a third level when the voltage ratio is in a reference voltage ratio range while the vehicle is being driven. The vehicle may be configured to generate driving torque using a stack current output from the fuel cell stack.

The fuel cell stack diagnosing method may further include: calculating a slope of a trend line generated by plotting the voltage ratio according to the stack current; and determining that the voltage measurement is abnormal as a fourth level when an absolute value of the slope is less than a reference slope. The fuel cell stack diagnosing method may further include calculating the voltage ratio without using a voltage value measured from the cell channel having the minimum cell channel voltage when the voltage measurement is determined as abnormal. Additionally, the fuel cell stack diagnosing method may include measuring an open circuit voltage of a load when starting the vehicle, and the determination that the voltage measurement is abnormal as the first level may be operated when the open circuit voltage of the load is equal to or greater than a reference voltage.

According to the exemplary embodiments, the present disclosure provides the fuel cell stack diagnostic system and the diagnostic method thereof, which may more accurately determine whether the damage signal from the diagnostic analyzer indicates a damaged unit cell or is merely a sensing error of the SVM.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Figure 1:
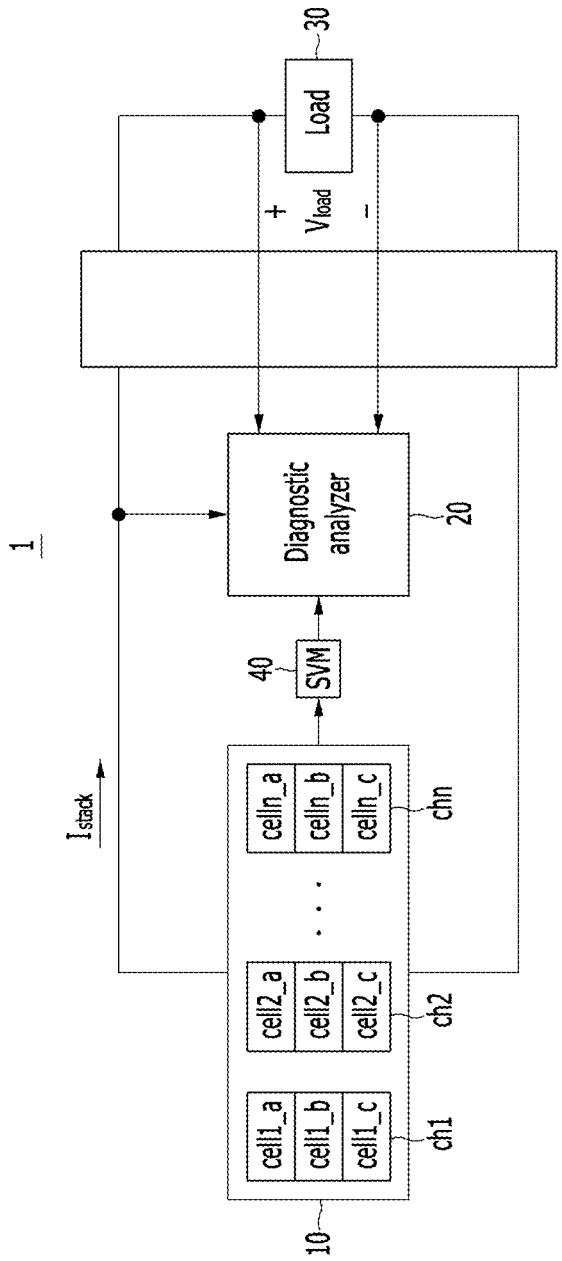
FIG. 1 is a drawing illustrating a fuel cell stack diagnostic system according to an exemplary embodiment.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, the present disclosure will be described more fully with reference to the accompanying drawings, in which exemplary embodiments of the disclosure are shown. As those skilled in the art would realize, the described exemplary embodiments may be modified in various different ways, all without departing from the spirit or scope of the present invention.

FIG. 1 is a drawing illustrating a fuel cell stack diagnostic system according to an exemplary embodiment. Referring to FIG. 1, a fuel cell stack diagnostic system 1 according to an exemplary embodiment may include a fuel cell stack 10 and a diagnostic analyzer 20. The fuel cell stack 10 and the diagnostic analyzer 20 may be operated by a controller. In FIG. 1, a load 30, which is inherent of a vehicle, may be changed based on a driving mode. For example, when starting the vehicle, the load 30 may not be present, and therefore the vehicle is in a no-load state. Further, the fuel cell stack 10 may include a plurality of cell channels ch1, ch2, . . . chn. The cell channel ch1 may include three unit cells cell1_a, cell1_b, and cell1_c, the cell channel ch2 may include three unit cells cell2_a, cell2_b, and cell2_c, and the cell channel chn may include three unit cells celln_a, celln_b, and celln_c.

Although an exemplary embodiment of FIG. 1 illustrates each cell channel including three unit cells, each cell channel may include one to four unit cells in another exemplary embodiment. In other words, each cell channel may include a different number of unit cells. For example, with reference to a hydrogen fuel cell vehicle, the fuel cell stack 10 may include 434 unit cells, and two to four unit cells may be grouped as one cell channel to form 116 cell channels. In the present exemplary embodiment, each cell channel is described as including three unit cells.

Furthermore, the diagnostic analyzer 20 may be configured to receive voltage measurement on each of the plurality of cell channels ch1, ch2, . . . chn. The voltage measurement may be performed by a stack voltage monitor (SVM) 40 (e.g., a sensor). Particularly, the diagnostic analyzer 20 may be configured to receive a load voltage $V_{load}$ and a stack current $I_{stack}$ output from the fuel cell stack 10. A conventional current sensor and voltage sensor may be respectively used to measure the current and voltage. The diagnostic analyzer 20 may be a fuel cell control unit (FCU). The diagnostic analyzer 20 may be a device which includes the SVM 40.

Figure 2:
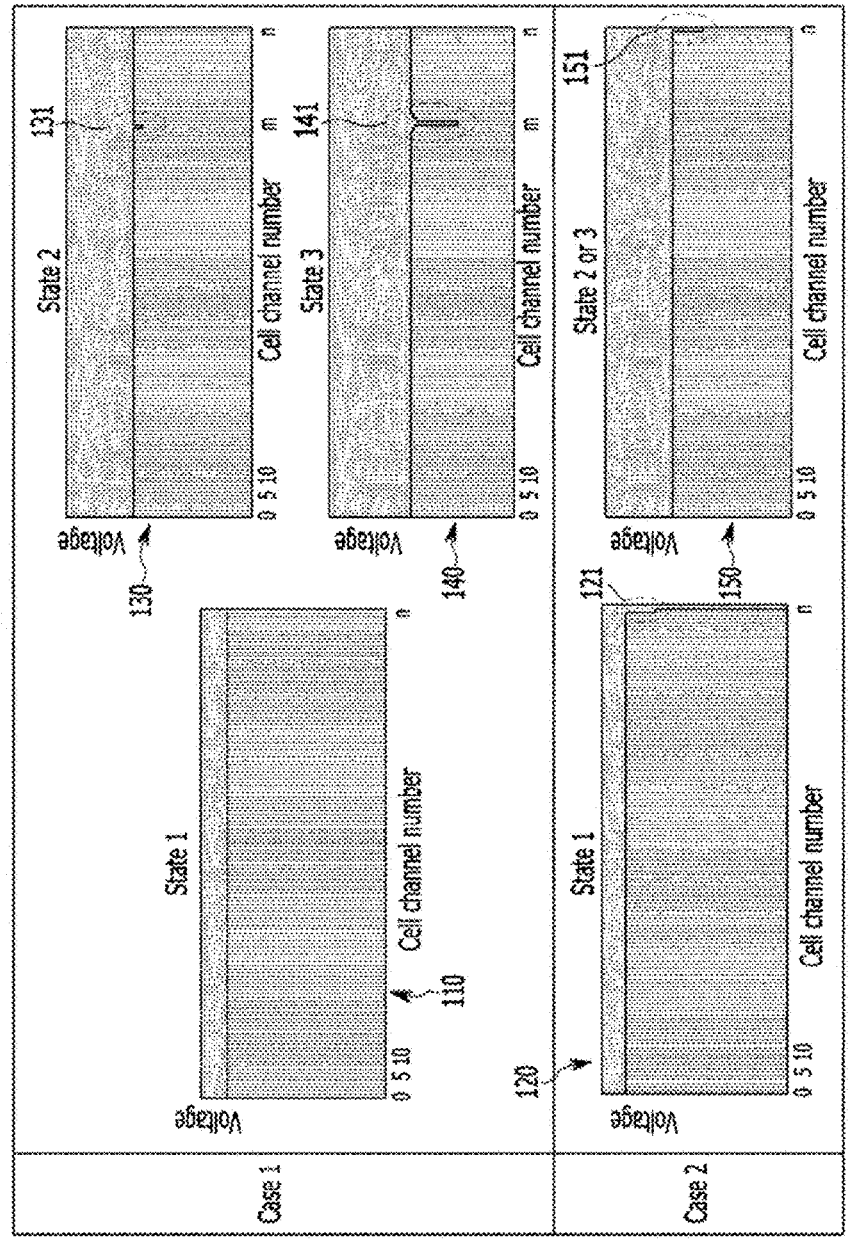
FIG. 2 is a drawing illustrating a plurality of graphs to compare a case of a damaged unit cell and a case of an abnormal voltage measurement being performed according to an exemplary embodiment.

FIG. 2 is a drawing illustrating a plurality of graphs to compare a case of a damaged unit cell and a case of abnormal voltage measurement being performed. Referring to FIG. 2, each horizontal axis of the plurality of monitoring graphs 110, 120, 130, 140, and 150 respectively represents cell channel numbers, and each vertical axis of the plurality of monitoring graphs 110, 120, 130, 140, and 150 respectively represents voltages of cell channels. Case 1 is the case of a damaged unit cell. Case 2 is the case of abnormal voltage measurement being performed. Furthermore, state 1 is a no-load state or a state at a time of starting a vehicle, state 2 is a medium power state, and state 3 is a high power state. The monitoring graphs 110, 120, 130, 140, and 150 are merely an exemplary embodiment, and therefore the monitoring graphs 110, 120, 130, 140, and 150 may differ according to specific configurations of the fuel cell stack 10 or the diagnostic analyzer 20, and according to manufacturers or types of vehicles.

The diagnostic analyzer 20 may be configured to provide the monitoring graph 110 when starting a vehicle or in a no-load state, when a unit cell is damaged (Case 1 and State 1). The stack current $I_{stack}$ may be 0 A, since the load 30 is in an open state. Particularly, the measured voltage $V_{load}$ may be referred to as "open circuit voltage". Since the cell channel voltages of the plurality of cell channels are similar, it may be difficult to determine which cell channel has a minimum cell channel voltage.

In the present exemplary embodiment, a voltage ratio may be defined as a ratio of the minimum cell channel voltage to an average cell channel voltage. In other words, the numerator of the voltage ratio is the minimum cell channel voltage and the denominator of the voltage ratio is the average cell channel voltage. Therefore, the voltage ratio is in a range 0 to 1. Ra1 may be about 1, wherein Ra1 is the voltage ratio calculated in the monitoring graph 110.

The diagnostic analyzer 20 may be configured to provide the monitoring graph 120 when starting the vehicle or in a no-load state, when the voltage measurement is abnormal (Case 2 and State 1). In particular, the SVM 40 may have an error in the measuring of a voltage of an n-th cell channel. Referring to the monitoring graph 120, voltages of most cell channels are similar, but an n-th cell channel voltage 121 is the minimum cell channel voltage. Rb1 may be less than 1, wherein Rb1 is the calculated voltage ratio herein. Therefore, Rb1 may be less than Ra1.

Therefore, the diagnostic analyzer 20 may be configured to determine that the voltage measurement of the SVM 40 is abnormal (e.g., erroneous) as a first level (e.g., a first level abnormality), when the calculated voltage ratio is less than a first reference voltage ratio when starting the vehicle. For example, the first reference voltage ratio may have a value between Rb1 and Ra1. The first reference voltage ratio may differ according to manufacturers or types of vehicles. The diagnostic analyzer 20 may be configured to determine that the voltage measurement is abnormal as the first level, using the above verification process.

Moreover, the diagnostic analyzer 20 may use an accumulated verification process to more accurately determine that the voltage measurement is abnormal. The accumulated verification process may include first to fourth levels of the verification process. The second to fourth levels of the verification process will be described later. The diagnostic analyzer 20 may be configured to determine that the voltage measurement is abnormal as the first level when an open circuit voltage of a load 30 is equal to or greater than a reference voltage and the voltage ratio is maintained less than the first reference voltage ratio for a reference time period when starting the vehicle.

The fuel cell stack diagnostic system 1 according to an exemplary embodiment may be configured to supercharge an air electrode (e.g. cathode) of the fuel cell stack 10 with air using an air blower, or supercharge a hydrogen electrode (e.g. anode) of the fuel cell stack 10 with hydrogen gas from a hydrogen gas tank. As a result of the supercharging, the diagnostic analyzer 20 may be configured to re-verify that the voltage measurement of the SVM 40 is abnormal. Particularly, the diagnostic analyzer 20 may be configured to determine that the voltage measurement of the SVM 40 is abnormal as a second level when the voltage ratio is less than a second reference voltage ratio after the supercharging. The voltage ratio that is less than the second reference voltage ratio after the supercharging indicates that the voltage ratio has changed minimally after the supercharging of air or hydrogen gas.

The voltage ratio may increase after the supercharging when the SVM 40 properly functions (e.g., operates without error or failure) and a unit cell is actually damaged. When the unit cell is actually damaged, a pin hole (e.g., a minimal opening or puncture) may be formed at a membrane of the unit cell. As a result, the voltage of the unit cell may decrease since the cross-over of hydrogen gas or air through the pin hole prevents normal reaction. However, by the supercharging, pressure of the electrode that is supercharged increases to prevent the cross-over of hydrogen gas or air coming from the opposite reactive electrode. Therefore, the voltage of the unit cell may become temporarily normal (e.g., stable). Thus, when a damaged unit cell is detected, the voltage ratio may increase by the supercharging. The second reference voltage ratio may be set as the increased voltage ratio being equal to or greater than the second reference voltage ratio. The second reference voltage ratio may differ according to manufacturers or types of vehicles.

Furthermore, the diagnostic analyzer 20 may be configured to provide the monitoring graph 130, when the fuel cell stack 10 outputs respectively medium power and a unit cell is actually damaged (Case 1 and State 2). The diagnostic analyzer 20 may be configured to provide the monitoring graph 140, when the fuel cell stack 10 outputs respectively high power and a unit cell is actually damaged (Case 1 and State 3). The fuel cell stack 10 outputs medium or high power when the vehicle is driven using the power from the fuel cell stack 10. Specifically, the diagnostic analyzer 20 may be configured to provide the monitoring graph 130 when the fuel cell stack 10 outputs relatively medium power, or in other words a minimal amount of the stack current $I_{stack}$ flows. Meanwhile, the diagnostic analyzer 20 may be configured to provide the monitoring graph 140 when the fuel cell stack 10 outputs relatively high power, or in other words a relatively substantial amount of the stack current $I_{stack}$ flows.

Referring to the monitoring graphs 130 and 140, cell channel voltages of the plurality of cell channels may change according to the change of the stack current $I_{stack}$. Additionally, voltage values 131 and 141 of an m-th cell channel are the minimum voltage values respectively in the monitoring graphs 130 and 140. Ra2 may be greater than Ra3, wherein Ra2 is the voltage ratio calculated in the monitoring graph 130 and Ra3 is the voltage ratio calculated in the monitoring graph 140.

Therefore, according to the output power changing from the medium power to the high power, or in other words according to the stack current increasing, the voltage ratio may be changed from Ra2 to Ra3. When the voltage ratio changes greater than a particular range, at least one unit cell included in the m-th cell channel may be determined to be damaged. In this exemplary embodiment, the particular range may be referred to as a reference voltage ratio range. The reference voltage ratio range may differ according to manufacturers or types of vehicles.

Figure 3:
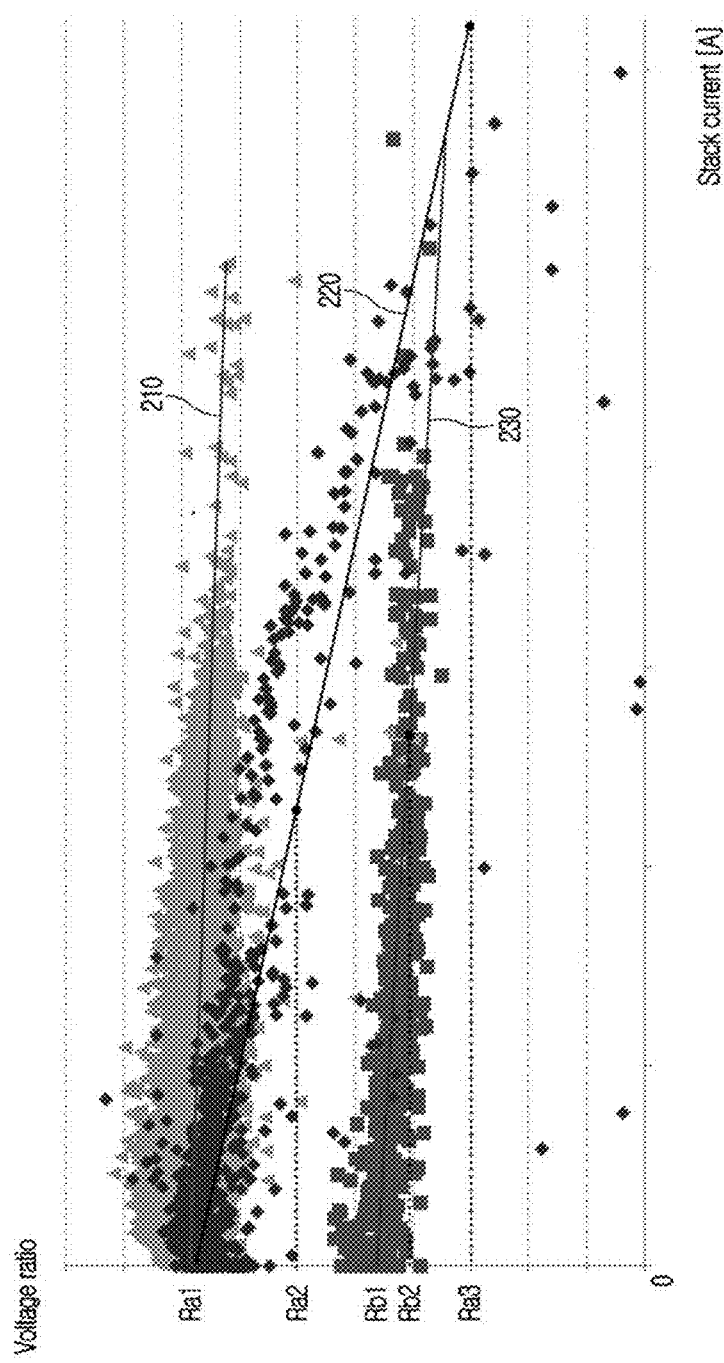
FIG. 3 is a drawing illustrating a plurality of trend lines according to a voltage ratio with reference to a stack current according to an exemplary embodiment.

Additionally, the diagnostic analyzer 20 may be configured to provide the monitoring graph 150 when the fuel cell stack 10 outputs medium or high power and the voltage measurement of the SVM 40 is abnormal (Case 2, and State 2 or 3). The fuel cell stack 10 may output medium or high power when the vehicle is driven using the power from the fuel cell stack 10. Herein, an error may be detected in the SVM 40 measurement of the voltage of the n-th cell channel Rb2 is the voltage ratio calculated in the monitoring graph 150. Ra2 may be maintained relatively constant according to the change of the output or the stack current $I_{stack}$ when the voltage measurement of the diagnostic analyzer 20 is abnormal. A changed amount of Rb2 may be insignificant compared to a detected damaged unit cell. FIG. 3 may be referred to in this regard. Therefore, since the voltage ratio is in the reference voltage ratio range, it may be possible to determine that the voltage measurement of the diagnostic analyzer 20 is abnormal as a third level.

FIG. 3 is a drawing illustrating a plurality of trend lines according to a voltage ratio with reference to a stack current. Referring to FIG. 3, in the graph of which a horizontal axis indicates the stack current and a vertical axis indicates the voltage ratio, a plurality of trend lines 210, 220, and 230 are illustrated. The trend line 210 is generated by plotting coordinates when both the SVM 40 and the fuel cell stack 10 are normal (e.g., operating without error), the trend line 220 is generated by plotting coordinates when a unit cell of the fuel cell stack 10 is damaged, and the trend line 230 is generated by plotting coordinates when the voltage measurement of the SVM 40 is abnormal. In the trend line 220, levels of the aforementioned Ra1, Ra2, and Ra3 are relatively indicated. Further, in the trend line 230, levels of aforementioned Rb1 and Rb2 are relatively indicated.

In FIG. 3, an absolute value of a slope of the trend line 230 is minimal compared to that of the trend line 220. Therefore, when a slope of a trend line is less than a reference slope, it may be possible to determine that the voltage measurement of the SVM 40 is abnormal as a fourth level. As discussed above, the voltage measurement of the SVM 40 may be determined as abnormal according to the first to fourth levels. The aforementioned first to fourth levels of the verification process may be conducted based on the aforementioned order. However, in another exemplary embodiment, the verification process may be conducted in an appropriately changed order, or an order in which at least one level of the verification process is omitted.

When the abnormal voltage measurement is confirmed using the above verification process, the cell channel having the minimum cell channel voltage may not be sensed by the voltage sensor and may be assumed to have an error. In other words, the diagnostic analyzer 20 may be configured to calculate the voltage ratio without the voltage value measured from the cell channel having the minimum cell channel voltage, by omitting or disregarding the measured voltage value. For example, the voltage ratio may be calculated by employing the voltage value measured from a cell channel having the $2^{nd}$ minimum cell channel voltage as the numerator of the voltage ratio. When the voltage measurement of the cell channel having the $2^{nd}$ minimum cell channel voltage is also confirmed as having an error, the voltage ratio may be calculated by employing the voltage value measured from a cell channel having the $3^{rd}$ minimum cell channel voltage as the numerator of the voltage ratio.

According to the present disclosure, the safety and reliability of the vehicle may be improved by preventing unnecessary current limitation, shutdown, starting failure situation, etc. which are caused by a sensing error.

The drawings and the detailed description of the present invention which are described above are merely illustrative, are just used for the purpose of describing the present invention, and are not used for qualifying the meaning or limiting the scope of the present invention which is disclosed in the appended claims. Therefore, it will be appreciated to those skilled in the art that various modifications and substitutions are made and other equivalent exemplary embodiments are available. Accordingly, the actual technical protection scope of the present invention should be determined by the spirit of the appended claims.

DESCRIPTION OF SYMBOLS

1: fuel cell stack diagnostic system
10: fuel cell stack
20: diagnostic analyzer
30: load
40: SVM

What is claimed is:

1. A fuel cell stack diagnostic system, comprising:
a fuel cell stack including a plurality of cell channels; and
a diagnostic analyzer configured to receive a voltage measurement of each of the plurality of cell channels,
wherein the diagnostic analyzer is configured to determine that the voltage measurement is abnormal as a first level when a voltage ratio is less than a first reference voltage ratio when starting a vehicle in which the fuel cell stack diagnostic system is mounted,
wherein the voltage ratio is a ratio of a minimum cell channel voltage to an average cell channel voltage, and
wherein the diagnostic analyzer is configured to determine that the voltage measurement is abnormal as the first level when an open circuit voltage of a load is equal to or greater than a reference voltage and the voltage ratio is maintained at less than the first reference voltage ratio for a reference time period when starting the vehicle.

2. The fuel cell stack diagnostic system of claim 1, wherein
the fuel cell stack diagnostic system is configured to supercharge the fuel cell stack with at least one of air and hydrogen gas, and
the diagnostic analyzer is configured to determine that the voltage measurement is abnormal as a second level when the voltage ratio is less than a second reference voltage ratio after the supercharging.

3. The fuel cell stack diagnostic system of claim 2, wherein the diagnostic analyzer is configured to determine that at least one unit cell within a cell channel having the minimum cell channel voltage is damaged when the voltage ratio is equal to or greater than the second reference voltage ratio after the supercharging.

4. The fuel cell stack diagnostic system of claim 3, wherein the diagnostic analyzer is configured to determine that a pinhole is formed at a membrane of the at least one unit cell when the voltage ratio is equal to or greater than the second reference voltage ratio after the supercharging.

5. The fuel cell stack diagnostic system of claim 2, wherein the diagnostic analyzer is configured to determine that the voltage measurement is abnormal as a third level when the voltage ratio is in a reference voltage ratio range while the vehicle is being driven.

6. The fuel cell stack diagnostic system of claim 5, wherein the vehicle generates driving torque using a stack current output from the fuel cell stack.

7. The fuel cell stack diagnostic system of claim 6, wherein the diagnostic analyzer is configured to calculate a slope of a trend line generated by plotting the voltage ratio according to the stack current, and determine that the voltage measurement is abnormal as a fourth level when an absolute value of the slope is less than a reference slope.

8. The fuel cell stack diagnostic system of claim 7, wherein the diagnostic analyzer is configured to calculate the voltage ratio by omitting a voltage value measured from the cell channel having the minimum cell channel voltage when the voltage measurement is determined as abnormal.

9. A fuel cell stack diagnosing method, comprising:
performing, by a controller, a voltage measurement on each of the plurality of cell channels comprised in a fuel cell stack; and
determining, by the controller, that the voltage measurement is abnormal as a first level when a voltage ratio is less than a first reference voltage ratio when starting a vehicle,
wherein the voltage ratio is a ratio of a minimum cell channel voltage to an average cell channel voltage, and
wherein the controller determines that the voltage measurement is abnormal as the first level when an open circuit voltage of a load is equal to or greater than a reference voltage and the voltage ratio is maintained at less than the first reference voltage ratio for a reference time period when starting the vehicle.

10. The fuel cell stack diagnosing method of claim 9, further comprising:
supercharging, by the controller, the fuel cell stack with at least one of air and hydrogen gas; and
determining, by the controller, that the voltage measurement is abnormal as a second level when the voltage ratio is less than a second reference voltage ratio after the supercharging.

11. The fuel cell stack diagnosing method of claim 10, further comprising:
determining, by the controller, that at least one unit cell within a cell channel having the minimum cell channel voltage is damaged when the voltage ratio is equal to or greater than the second reference voltage ratio after the supercharging.

12. The fuel cell stack diagnosing method of claim 11, wherein the determination that the at least one unit cell is damaged indicates a formation of a pinhole at a membrane of the at least one unit cell.

13. The fuel cell stack diagnosing method of claim 10, further comprising:
determining, by the controller, that the voltage measurement is abnormal as a third level when the voltage ratio is in a reference voltage ratio range while the vehicle is being driven.

14. The fuel cell stack diagnosing method of claim 13, wherein the vehicle generates driving torque using a stack current output from the fuel cell stack.

15. The fuel cell stack diagnosing method of claim 14, further comprising:
calculating, by the controller, a slope of a trend line generated by plotting the voltage ratio according to the stack current; and
determining, by the controller, that the voltage measurement is abnormal as a fourth level when an absolute value of the slope is less than a reference slope.

16. The fuel cell stack diagnosing method of claim 15, further comprising:
calculating, by the controller, the voltage ratio by omitted a voltage value measured from the cell channel having the minimum cell channel voltage when the voltage measurement is determined as abnormal.

* * * * *